(12) United States Patent
Nielsen

(10) Patent No.: US 9,574,921 B2
(45) Date of Patent: Feb. 21, 2017

(54) DISPENSING DEVICES FOR DISPENSING PRECISE DOSES OF LIQUID

(71) Applicant: Mezurware, LLC, Kernersville, NC (US)

(72) Inventor: Keld Krogh Nielsen, Graasten (DK)

(73) Assignee: Mezurware LLC, Kernersville, NC (US)

( * ) Notice: Subject to any disclaimer, the term of this patent is extended or adjusted under 35 U.S.C. 154(b) by 20 days.

(21) Appl. No.: 14/806,416

(22) Filed: Jul. 22, 2015

(65) Prior Publication Data

US 2016/0025541 A1    Jan. 28, 2016

Related U.S. Application Data

(60) Provisional application No. 62/028,971, filed on Jul. 25, 2014, provisional application No. 62/118,858, filed on Feb. 20, 2015.

(51) Int. Cl.
 *G01F 11/26* (2006.01)
 *G01F 11/16* (2006.01)

(52) U.S. Cl.
 CPC ............. *G01F 11/262* (2013.01); *G01F 11/16* (2013.01)

(58) Field of Classification Search
 CPC ................................ G01F 11/262; G01F 11/16
 USPC .............. 222/1, 424.5, 425, 145.5, 327, 386
 See application file for complete search history.

(56) References Cited

U.S. PATENT DOCUMENTS

| | | | |
|---|---|---|---|
| 4,566,610 A * | 1/1986 | Herb | B05C 17/00516 222/137 |
| 4,941,598 A | 7/1990 | Lambelet, Jr. et al. | |
| 5,125,539 A | 6/1992 | Schneider | |
| 5,310,091 A * | 5/1994 | Dunning | B65D 81/325 222/135 |
| 5,680,969 A | 10/1997 | Gross | |
| 6,082,586 A * | 7/2000 | Banks | A47K 5/14 222/105 |

(Continued)

FOREIGN PATENT DOCUMENTS

| | | |
|---|---|---|
| WO | WO 2008/086959 | 7/2008 |
| WO | WO2009/076959 | 6/2009 |
| WO | WO2013/126553 | 8/2013 |

OTHER PUBLICATIONS

International Search Report and Written Opinion for corresponding PCT Application No. PCT/US2015/041711, date of mailing Dec. 16, 2015, 13 pages.

*Primary Examiner* — Donnell Long

(74) *Attorney, Agent, or Firm* — Myers Bigel, P.A.

(57) ABSTRACT

A dispensing device includes: a first chamber and a second chamber, the first chamber being longitudinally movable in the second chamber; an outlet passage fluidly connected to the second chamber; an intermediate valve positioned between an interior part of the first chamber and an interior part of the second chamber. The valve is configured to allow the liquid product to flow from the interior space of first chamber to the interior space of the second chamber when the first chamber is moved in a first longitudinal direction and to limit flow of the liquid product from the second chamber to the first chamber when the first chamber is moved in an opposite second longitudinal direction. A blocking member is movable in concert with the first chamber and configured to seal the outlet passage when the valve limits flow from the second chamber to the first chamber.

19 Claims, 9 Drawing Sheets

(56) References Cited

U.S. PATENT DOCUMENTS

| | | | |
|---|---|---|---|
| 7,481,333 B2* | 1/2009 | Goldberg | B05C 17/00506 222/1 |
| 2010/0025430 A1 | 2/2010 | Cisewski et al. | |
| 2010/0116852 A1 | 5/2010 | Painchaud et al. | |
| 2010/0206905 A1* | 8/2010 | Horner | A61C 5/064 222/137 |
| 2012/0104044 A1* | 5/2012 | Pappalardo | B05C 17/005 222/137 |
| 2012/0261441 A1 | 10/2012 | van den Hoonaard | |
| 2013/0214005 A1 | 8/2013 | Nielsen | |
| 2014/0048570 A1 | 2/2014 | Brall | |

* cited by examiner

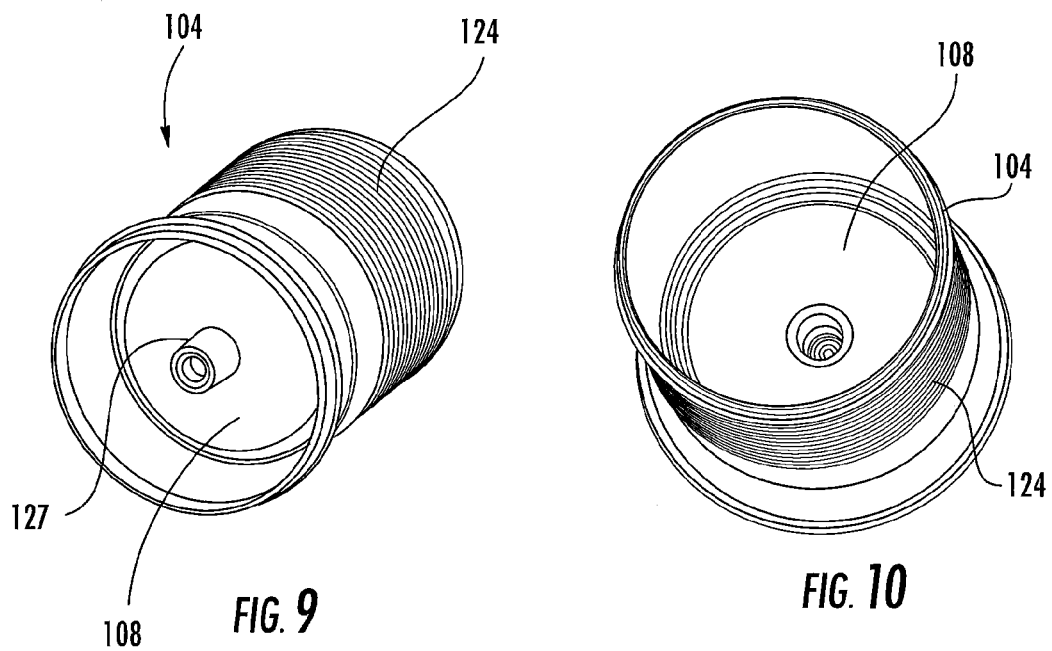
FIG. 9
FIG. 10
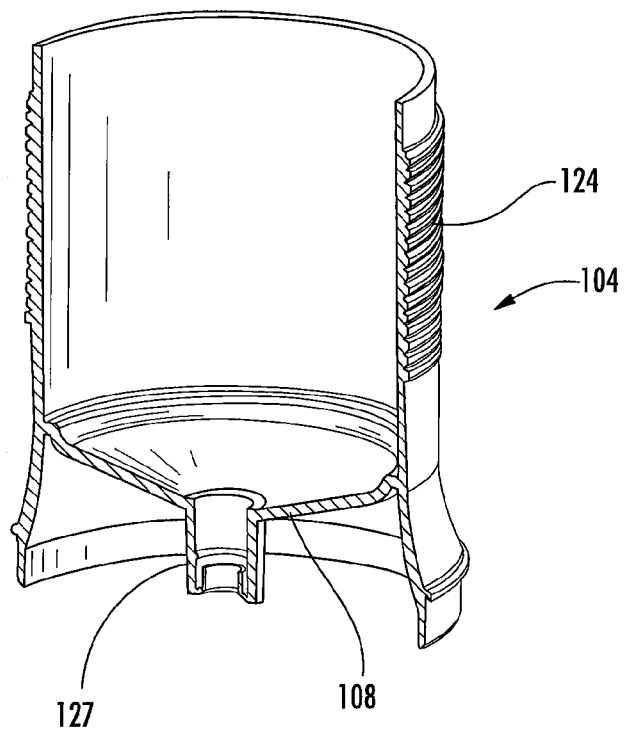
FIG. 11

DISPENSING DEVICES FOR DISPENSING PRECISE DOSES OF LIQUID

RELATED APPLICATIONS

The present application claims priority from and the benefit of U.S. Provisional Patent Application Nos. 62/028,971, filed Jul. 25, 2014, and 62/118,858, filed Feb. 20, 2015, the disclosures of which are hereby incorporated herein in their entireties.

FIELD OF THE INVENTION invention relates to a dispensing device for dispensing a liquid product, and more particularly to a liquid dispenser being capable of delivering consistently precise doses of liquid product.

BACKGROUND OF THE INVENTION

International Publication No. WO 2009/076959 A1 discloses a dispensing device for dispensing doses of liquid medium. Exemplary liquids include cleaning materials, detergents, softeners, liquid toilet soap, shampoo, medicine, paint, and liquid foodstuffs such as syrup, pulped marmalade, chocolate sauce, ketchup, different type of dressings, sauces, and the like. The dispensing device comprises a first chamber and a second chamber divided from each other by an intermediate wall arranged in an interior part of the dispensing device. An inlet passage establishes a fluid connection between the first chamber and an interior part of a container containing the liquid product, and an outlet passage allows liquid product to be dispensed from the second chamber. An intermediate passage is defined at a position of an edge of the intermediate wall, thereby allowing a dose of liquid product to pass from the first chamber to the second chamber. The intermediate wall comprises a portion which is inclined or curved in a direction towards the first chamber. Thereby the first chamber defines a cavity or bowl-shaped region which traps liquid product when the dispensing device is oriented in a certain direction during a dispensing movement. This prevents liquid product from passing directly through the dispensing device.

One disadvantage of the dispensing device of WO 2009/076959 is that sticky and viscous liquid flows slowly out of the dispenser, and that, especially in the last part of the dosing process, such slow flow can lead the user to stop dosing before the dosing chamber is empty and thereby result in errors in the doses being dispensed by means of the dispensing device.

Additional dispensing devices are discussed in International Publication No. WO 2013/126553, the disclosure of which is hereby incorporated herein in its entirety. The devices discussed therein include an intermediate valve member that opens to allow filling of the second chamber, but closes upon dispensing of liquid from the second chamber, thus enabling the dispensing of precise doses of liquid material.

It may be desirable to provide additional designs that can precisely dispense liquids, such as from a container containing the liquid product.

SUMMARY OF THE INVENTION

As a first aspect, embodiments of the invention are directed to a precise-dosing dispensing device. The device comprises: a first chamber and a second chamber, the first chamber being longitudinally movable in the second chamber and having an outer surface sealingly contacting an inner surface of the second chamber; an outlet passage adapted to deliver the liquid product being dispensed by the dispensing device, said outlet passage being fluidly connected to the second chamber; an intermediate valve positioned between an interior part of the first chamber and an interior part of the second chamber, wherein the valve is configured to (a) allow the liquid product to flow from the interior space of first chamber to the interior space of the second chamber when the first chamber is moved in a first longitudinal direction and to (b) limit flow of the liquid product from the interior space of the second chamber to the interior space of the first chamber when the first chamber is moved in an opposite second longitudinal direction to dispense the liquid product from the second chamber through the outlet passage; and a blocking member movable in concert with the first chamber, the blocking member configured to seal the outlet passage when the valve limits flow of the liquid product from the interior space of the second chamber to the interior space of the first chamber.

As a second aspect, embodiments of the invention are directed to a device for dispensing a liquid mixture, comprising: a piston including first and second subchambers, each of the first and second subchambers including openings at one end thereof; a sleeve that receives the piston and is slidable relative thereto, the sleeve including a dispensing outlet, wherein the piston is slidable between a mixing position, wherein a mixing chamber is formed between the piston and the sleeve that is in fluid communication with the first and second subchambers, and a dispensing position; and a valve positioned between the piston and the dispensing outlet of the sleeve, the valve configured to move between an open position, which allows liquid product to flow from the first and second subchambers through the openings to the mixing chamber when the piston is moved relative to the sleeve to the mixing position, and to a closed position, which limits flow of the liquid product from first and second subchambers through the openings to the mixing chamber when the piston is moved relative to the sleeve to the dispensing position to dispense the liquid product from the mixing chamber through the dispensing outlet. The first and second subchambers are in fluid isolation from each other when the piston is in the dispensing position.

As a third aspect, embodiments of the invention are directed to a method of dispensing a mixture of liquids. The method comprises the steps of:

(a) providing a dispensing device comprising:
  a piston including first and second subchambers, each of the first and second subchambers including openings at one end thereof, the first subchamber filled with a first liquid, and the second subchamber filled with a second liquid that is different than the first liquid;
  a sleeve that receives the piston and is slidable relative thereto, the sleeve including a dispensing outlet;
  wherein the piston is slidable between a mixing position, wherein a mixing chamber is formed between the piston and the sleeve that is in fluid communication with the first and second subchambers, and a dispensing position; and
  a valve positioned between the piston and the dispensing outlet of the sleeve, the valve configured to move between an open position, which allows liquid product to flow from the interior space of the first and second subchambers through the openings to the mixing chamber when the piston is moved relative to the sleeve to the mixing position, and to a closed position, which limits flow of the liquid product from the interior space of the first and second subchambers through the openings to the interior space of the mixing chamber when the piston is moved relative to the sleeve to the dispensing position to dispense the liquid product from the mixing chamber through the dispensing outlet;

wherein the first and second subchambers are in fluid isolation from each other when the piston is in the dispensing position;

(b) sliding the piston to the mixing position to allow a portion of the first liquid and a portion of the second liquid to flow into the mixing chamber to form a mixture; and (c) sliding the piston to the dispensing position to dispense the mixture from the mixing chamber.

BRIEF DESCRIPTION OF THE FIGURES

FIG. 9 is bottom perspective view of the sleeve of the dispensing device of FIG. 4.

FIG. 10 is a top perspective view of the sleeve of FIG. 9.

FIG. 11 is a perspective section view of the sleeve of FIG. 9.

DETAILED DESCRIPTION OF EMBODIMENTS OF THE INVENTION

Figure 1:
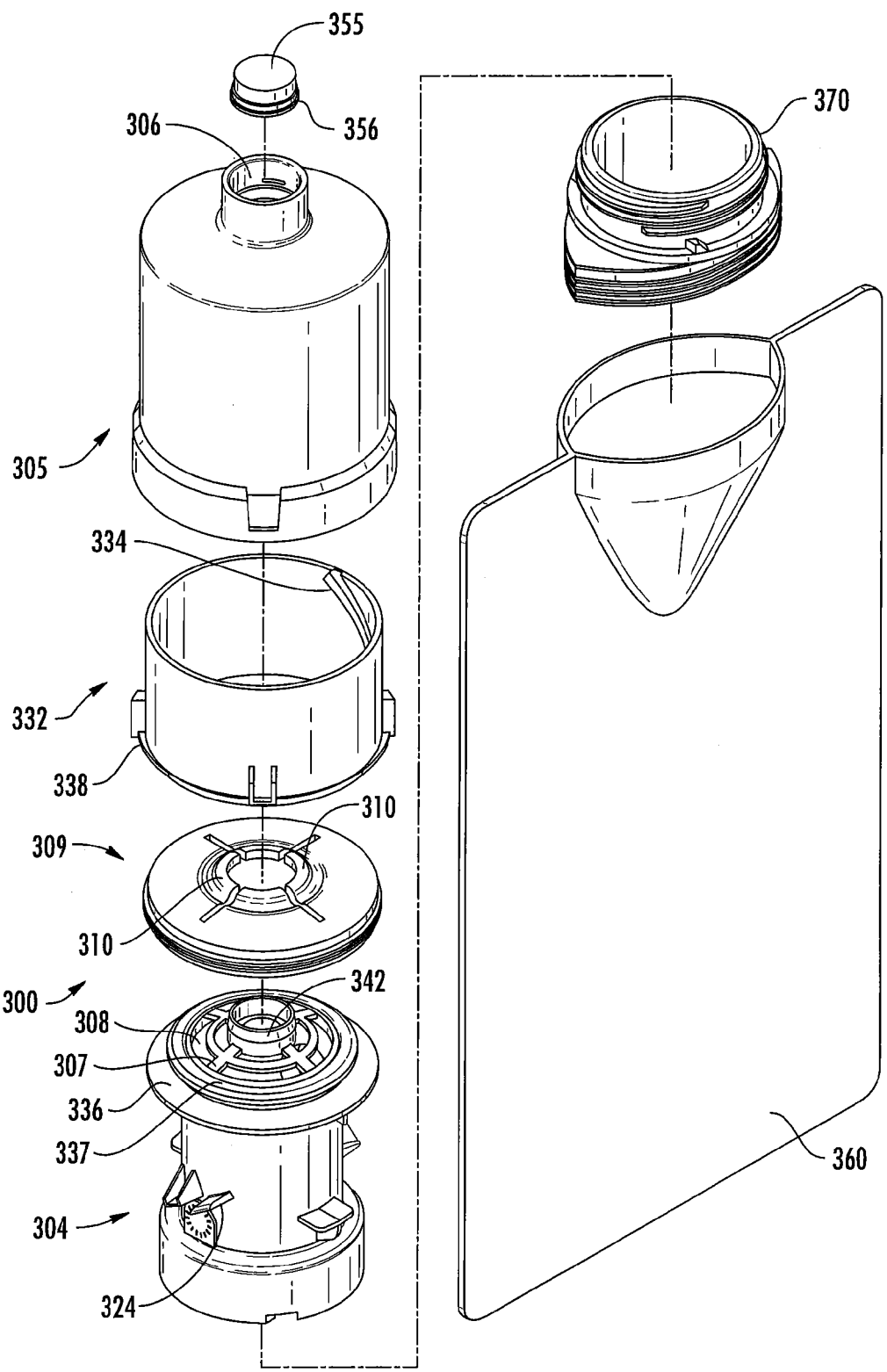
FIG. 1 is an exploded perspective view of a dispensing cap and bottle according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Like numbers refer to like elements throughout the description.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
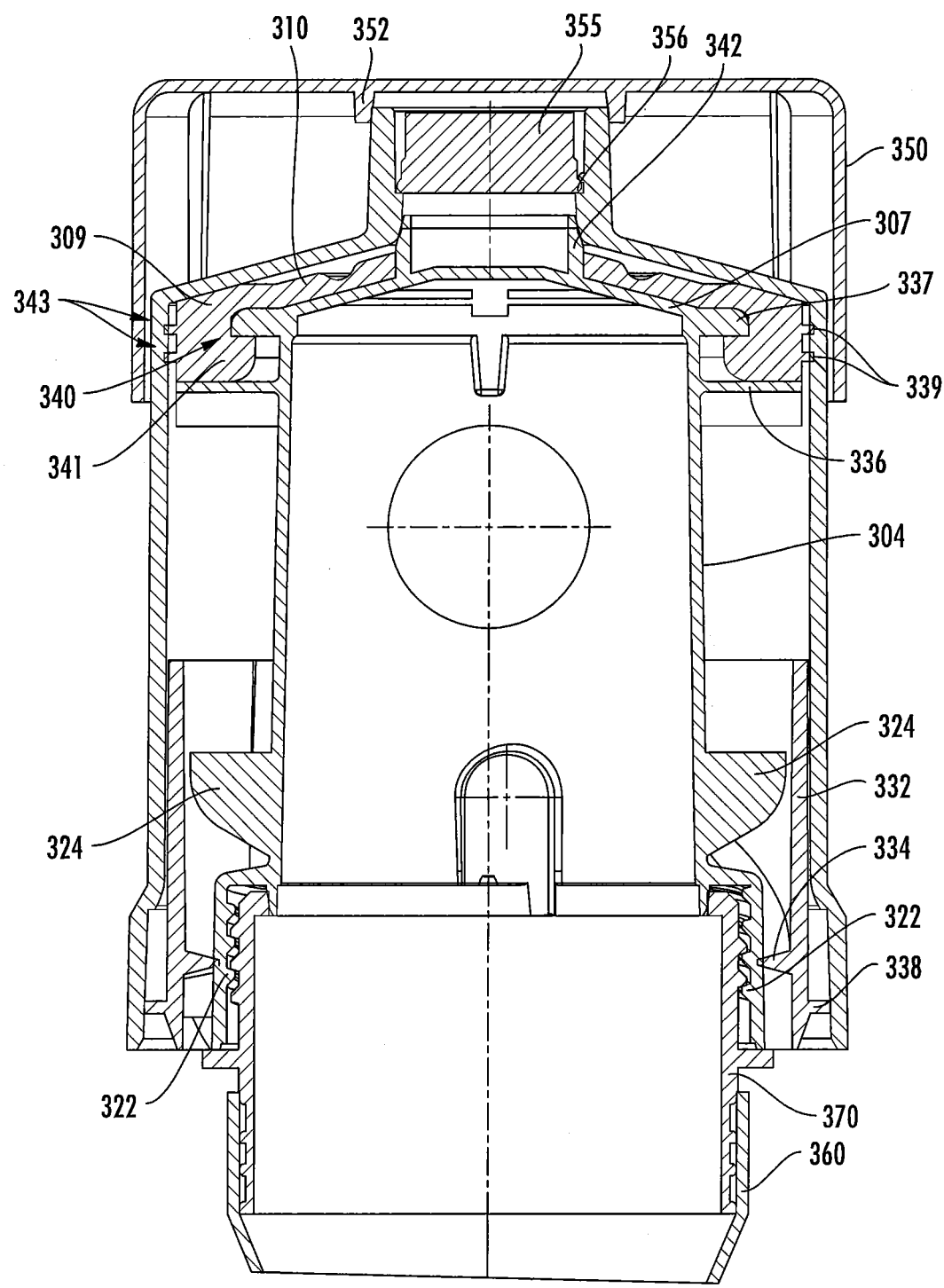
FIG. 2 is a section view of the dispensing cap of FIG. 1 shown in the retracted position.
Figure 3:
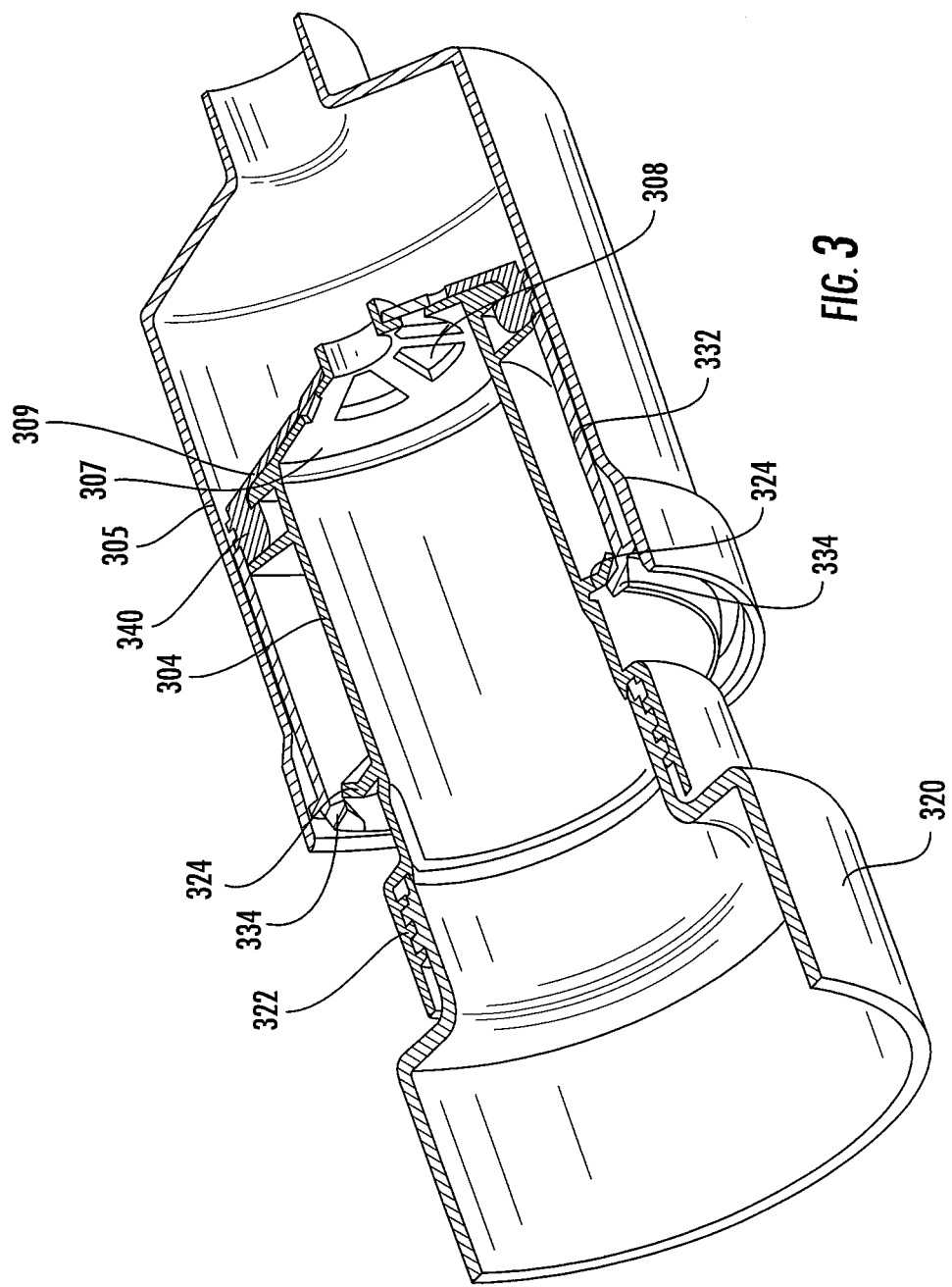
FIG. 3 is a perspective section view of the dispensing cap of FIG. 1 shown in the extended position.

Referring now to the figures, an embodiment of a dispensing device, designated broadly at 300, is disclosed in FIGS. 1-3. The dispensing device 300 includes first and second chambers 304, 305, a valve flapper plate 309, a cam sleeve 332, a lid 350, a cap 355, a flexible bag 360, and a fitment 370. These components are described below.

As shown in FIGS. 1 and 2, the first chamber 304 is generally cylindrical and includes internal threads 322 at its lower end. These threads 322 enable the first chamber 304, and therefore the entire dispensing device, to be threaded onto the fitment 370 (with the fitment 370 then being attached to the bag 360). This configuration enables the dispensing device 300 to be retrofitted to an existing fitment, bag, bottle or other container of the proper size, and/or to replace and function as the lid of an existing container that can provide a measured dose of a liquid contained in the container.

The first chamber 304 also has a plate 307 at its upper end that serves as a valve seat. The plate 307 includes a plurality of openings 308 (in this instance, eight openings 308 are shown). A circular boss 342 extends upwardly from the upper surface of the plate 307. The first chamber 304 further includes a circumferential rib 336 near its valve end that projects radially outwardly, and a smaller lip 337 that also projects radially outwardly. The rib 336 and lip 337 are configured to engage a groove 340 and a flange 341 of the valve flapper plate 309.

The first chamber 304 also includes two rotation guides 324 on its outer surface. The rotation guides 324 are canted to engage a respective thread 334 on the inner surface of the generally cylindrical cam sleeve 332 as it encircles the lower end of the first chamber 304. As can be seen in FIGS. 1 and 2, each of the threads 334 describes a partial helix within the cam sleeve 332. The cam sleeve 332 also has a ridge 338 on its outer surface that contacts the inner surface of the second chamber 305.

The valve flapper plate 309 is disposed above the plate 307 of the first chamber 304. The valve flapper plate 309 is generally disc-shaped and includes a plurality of radially-inwardly extending flaps 310 that align with and overlie the openings 308 in the plate 307 (in the illustrated embodiment, four flaps 310 are shown). When the flaps 310 deflect away from the plate 307, liquid can flow from the first chamber 304 through the openings 308 in the plate 307 and into the second chamber 305 during dispensing of liquid product. The valve flapper plate 309 includes the aforementioned groove 340, which receives the lip 337 of the first chamber 304, and the aforementioned flange 341, which is positioned between the rib 336 and the lip 337 to hold the valve flapper plate 309 in place. The valve flapper plate 309 further includes two circumferential lips 339 that extend radially outwardly.

The valve flapper plate 309 is typically formed of a flexible material that enables the flaps 310 to deflect away from the openings 308. Exemplary materials include EPDM and other flexible materials, particularly polymeric materials.

The second chamber 305 is generally cylindrical with a largely closed upper end. An outlet passage 306 adapted to deliver liquid being dispensed by the dispensing device is present in the center of the upper end of the second chamber 305. Two circumferential grooves 343 are present on the inner surface of the second chamber 305 and are configured to receive the lips 339 of the valve flapper plate 309.

In the illustrated embodiment, the cap 355 is generally cylindrical with an open lower end. The cap 355 fits within the outlet passage 306, with a rim 356 engaging a small detent therein. The lid 350 is attached to the second chamber 305 and covers the outlet passage 306 thereof as well as the cap 355. The lid 350 includes a circular boss 352 on its lower surface that is adapted to press-fit around the outer surface of the outlet passage. Both the cap 355 and the lid 350 can be of many different configurations that would be well-recognized by those of skill in this art and need not be described in detail herein.

In operation, the dispensing device 300 begins in a retracted non-dispensing position shown in FIG. 2. In this position, the valve seat plate 307 and valve flapper plate 309 are adjacent the dispensing end of the second chamber 305. The ridge 336 of the cam sleeve 332 contacts the inner surface of the second chamber 305 near its open end. The threads 334 of the cam sleeve 332 engage the rotation guides 324 of the first chamber 304 at their ends farthest from the bottle 320. Also, the lips 339 of the valve flapper plate 309 are received in the grooves 343 of the second chamber 305 to maintain the second chamber 305 in place.

As can be seen in FIG. 2, the circular boss 342 fits against the outlet passage 306 of the second chamber 305. Thus, it can be seen that in the closed position, the circular boss 342 provides a seal that can help prevent leakage of liquid from the first chamber 304 into and through the outlet passage 306 of the second chamber 305. The circular boss 342 may be particularly effective in preventing leakage when the bag 320 or other container to which the cap 300 is attached is inverted (i.e., with its open end facing down). The weight of the liquid in the container (and within the first chamber 304) forces the circular boss 342 into and against outlet passage 306, which helps to seal the first chamber 304 from the outlet passage 306.

To dispense a measured dose of liquid, the second chamber 305, cam sleeve 332 and lid 350 are rotated relative to the first chamber 304 and bag 360 (counterclockwise from the vantage point of FIG. 1). Such rotation, controlled by the interaction between the threads 334 of the cam sleeve 332 and the rotation guides 324 of the first chamber 304, drives the second chamber 305, cam sleeve 332 and lid 305 longitudinally away from the first chamber 304 and bag 360 to an extended position (FIG. 3). The relative longitudinal movement automatically deflects the flaps 310 of the valve flapper plate 309 away from the holes 308 in the valve seat plate 307, thereby providing openings for liquid to flow from the first chamber 304 to the second chamber 305.

Once the second chamber 305 is filled with liquid, the cap 355 and lid 350 (if still present) can then be removed from the second chamber 305. The measured dose of liquid present in the second chamber 305 is dispensed from the second chamber 305 through the outlet passage 306 by rotating the second chamber 305 in the opposite direction relative to the first chamber 304 (clockwise from the vantage point of FIG. 1). The relative longitudinal motion of the second chamber 305 back toward the first chamber 304 forces the liquid in the second chamber 305 out of the outlet passage 306. The return of the second chamber to the retracted position of FIG. 2 also forces the flaps 310 of the valve flapper plate 309 to deflect onto and over the holes 308 in the valve seat plate 307, thereby preventing liquid from entering the second chamber 305 and maintaining the precise dose of liquid drawn into the second chamber 305 during the initial rotation of the second chamber 305.

It will be understood that the dispensing device 300 may be used as a cap or lid to an existing container; the device 300 may simply be screwed onto the threads of the container as a replacement for an existing lid to provide a measured dose of the liquid of interest. Also, a container may be constructed with the top of the container serving as the first chamber.

Although not shown, in some embodiments the second chamber 305 may include markings or other indicia on its visible surface to indicate the amount of liquid being dispensed. For example, if the full measured dose of liquid is 1 cup and requires a 180 degree rotation of the second chamber 305, a quarter turn of the second chamber 305 may be marked with a ½ cup measurement indicia, a ⅛ turn may be marked with a ¼ cup measurement indicia, etc. In some embodiments, there may be detents, notches or the like in the threads 334 of the cam sleeve 332 that engage the guides 324 of the first chamber 304 to temporarily "lock" the cam sleeve 332 at a desired rotation for a particular measured dose that is less than the full measured dose.

It should also be understood that, although the circular boss 342 is illustrated herein, other blocking members that seal the first chamber 304 from the second chamber 305 may also be employed. For example, the outlet 306 may be oval, square, or rectangular, in which case the boss 342 would be shaped to mate appropriately. Also, in some embodiments the boss 342 or other blocking member may contact the second chamber outside of the outlet 306 as long as a sufficient seal to prevent leakage is achieved.

Referring now to FIGS. 4-18, a dispensing device, designated broadly at 100, is disclosed therein. The dispensing device 100 includes a piston 102, a sleeve 104, a valve 106, a stopper 110 and a lid 112. These components are described in more detail below.

Figure 6:
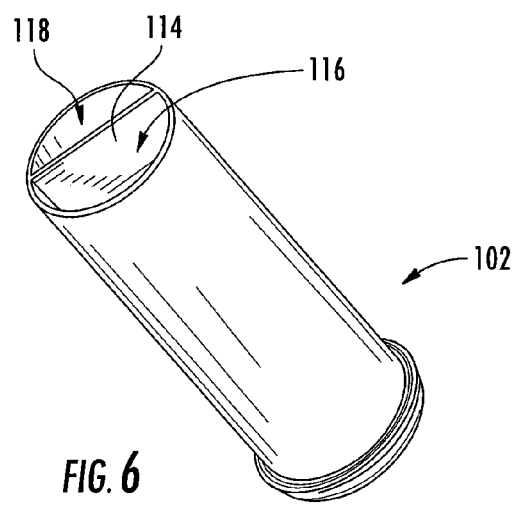
FIG. 6 is a top perspective view of the piston of the dispensing device of FIG. 4.
Figure 7:
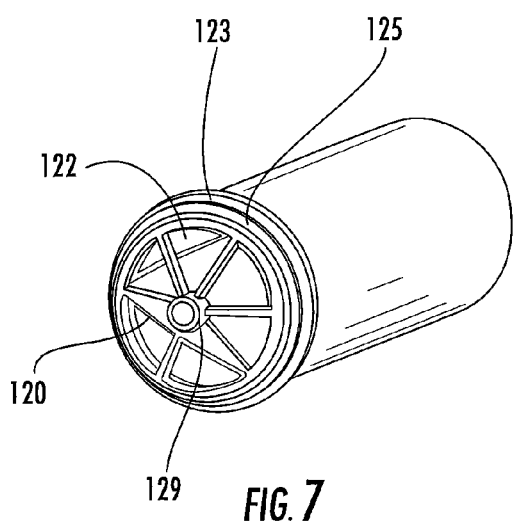
FIG. 7 is a bottom perspective view of the piston of FIG. 6.
Figure 8:
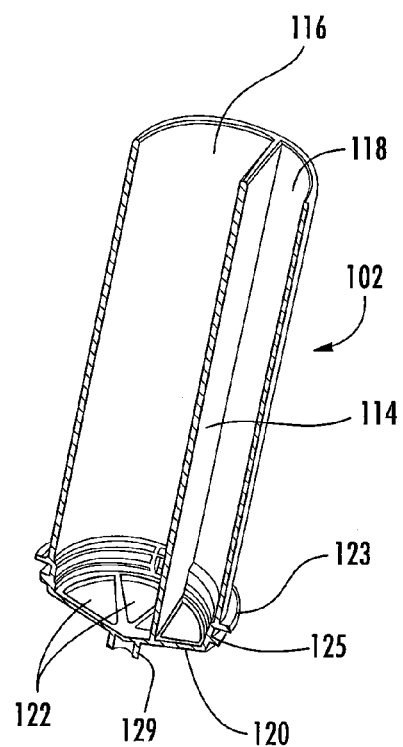
FIG. 8 is a perspective section view of the piston of FIG. 6.

Referring to FIGS. 6-8, the piston 102 is generally cylindrical. A divider 114 extends axially between the ends of the piston 102, thereby dividing the interior of the piston 102 into two subchambers 116, 118. In the illustrated embodiment, the divider 114 is located so that the subchambers 116, 118 are of different volumes for storing liquids (e.g., the subchamber 116 may hold two or three times as much liquid as the subchamber 118); in other embodiments, the subchambers 116, 118 may hold equal amounts of liquids. One end of the piston 102 is open; the opposite end terminates with a spoked valve dome 120 that has triangular openings 122. A rim 123 extends radially outwardly near the valve dome 120. A lip 125 also protrudes radially outwardly between the rim 123 and the valve dome 120. An open nipple 129 extends away from the center of the valve dome 120.

The piston 102 is typically formed of a polymeric material such as polypropylene. In some embodiments, the piston 102 may be formed of a transparent material to enable the user to see how much liquid remains therein.

Referring now to FIGS. 9-11, the sleeve 104 is generally cylindrical and is slightly larger in diameter than the piston 102, such that the valve dome 120 is inserted into the sleeve 104. The sleeve 104 may have ridges 124 on its outer surface to provide improve grip for the operator. A rim 126 (FIGS. 4 and 5) fits on one end of the sleeve 104; the inner lip of the rim 126 is positioned to interact with the rim 123 of the piston 102 to maintain the piston 102 within the sleeve 104. The sleeve 104 is slightly flared at the opposite end and fits within the stopper 110. A funnel-shaped spout 108 spans the interior of the sleeve 104 near the flared end. The spout 108 has a dispensing nozzle 127 that extends toward the flared end of the sleeve 104; the nozzle 127 is sized to receive the nipple 129 of the valve dome 120.

The sleeve 104 is typically formed of a polymeric material such as polypropylene. In some embodiments, the sleeve 104 may be formed of a transparent material to enable the user to see how much liquid remains therein.

Figure 5:
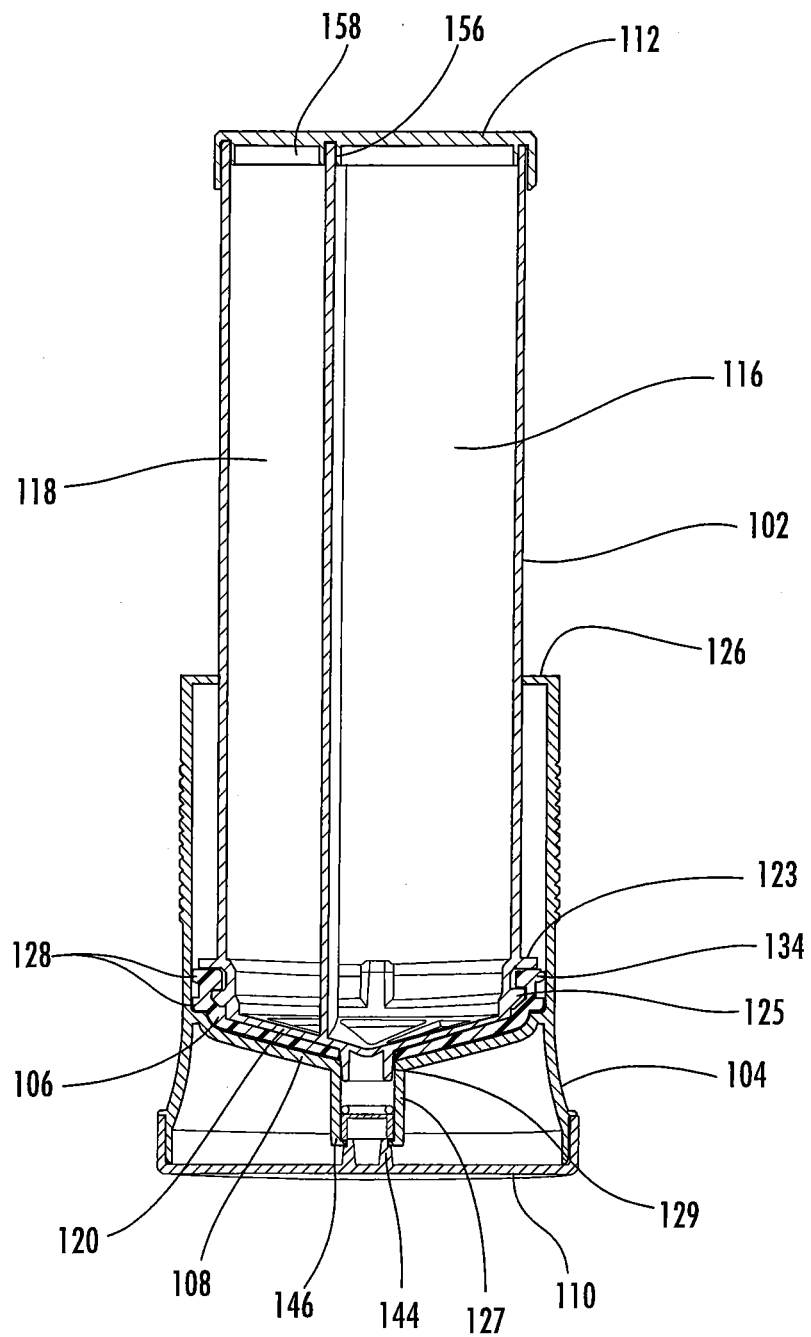
FIG. 5 is a section view of the dispensing device of FIG. 4.
Figure 12:
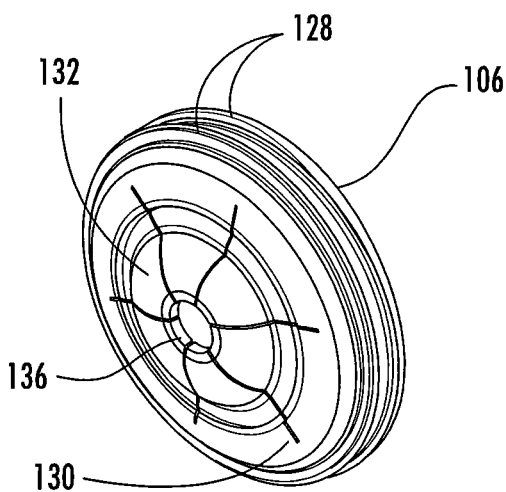
FIG. 12 is a bottom perspective view of the valve of the dispensing device of FIG. 4.
Figure 13:
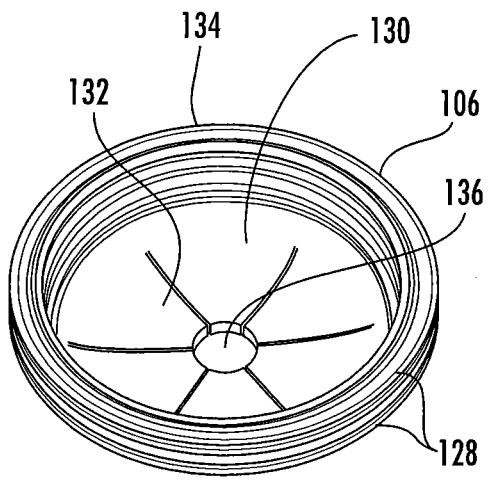
FIG. 13 is a top perspective view of the valve of FIG. 12.
Figure 14:
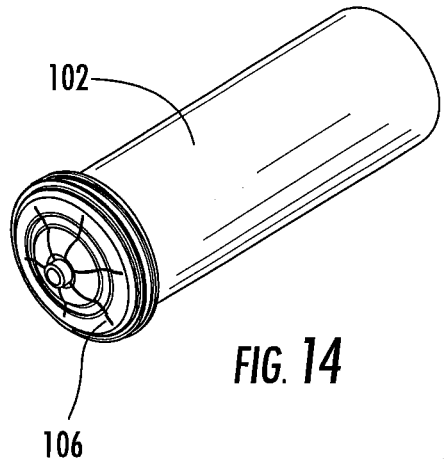
FIG. 14 is a perspective view of the valve of FIG. 12 mounted on the piston of FIG. 6.

Referring now to FIGS. 12-14, the valve 106 is generally a short cylinder with two radially-outwardly extending ridges 128. One end of the valve 106 comprises a convex surface 130 in which flaps 132 are formed. The valve 106 also has a lip 134 that extends radially inwardly. As can be seen in FIGS. 5 and 14, the lip 134 resides between the rim 123 and the lip 125 of the piston to maintain the valve 106 in position over the valve dome 120. The ridges 128 extend outwardly a sufficient distance to engage the inner surface of the sleeve 104 and provide a watertight seal therewith. The flaps 132 overlie the openings 122 in the valve dome 120 to provide a watertight seal. Opposite the valve dome 120, the valve 106 rests against the concave surface of the spout 108. A hole 136 in the valve 106 provides access for the nipple 129 of the valve dome 120.

The valve 106 is typically formed of an elastomeric material that enables the flaps to flex repeatedly. Exemplary materials include PPE, rubber, and thermoplastic elastomer.

Figure 15:
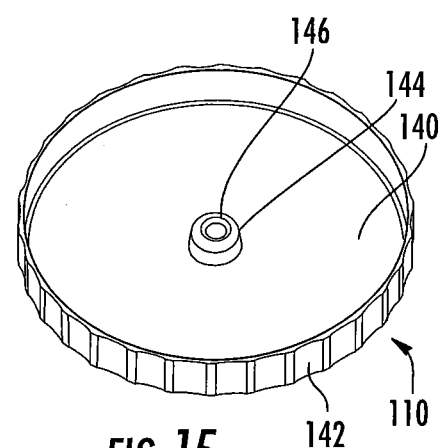
FIG. 15 is a top perspective view of the stopper of the dispensing device of FIG. 4.

Referring now to FIG. 15, the stopper 110 is generally a flat disc 140 with a rim 142 that covers a portion of the flared end of the sleeve 104. The rim 142 is typically sized to press-fit onto the sleeve 104, although in some embodiments the rim may be threaded onto or otherwise removably attached to the end of the sleeve 104. A cylindrical plug 144 with a thin wall 146 extends from the center of the disc 140 into the nozzle 129 of the spout 108.

Figure 16:
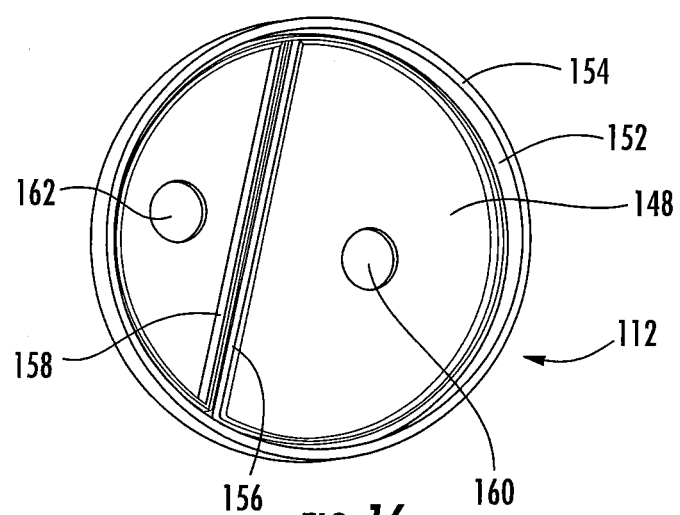
FIG. 16 is a bottom perspective view of the lid of the dispensing device of FIG. 4.

Referring now to FIG. 16, the lid 112 has a top surface 148 and a downwardly-depending rim 152. An inner lip 154 is positioned radially inwardly of the rim 152. Two dividers 156, 158 extend across the top surface 148 between discontinuities in the lip 154. As such, when the lid 112 is positioned on the upper end of the piston 102 (typically via a press-fit interaction), the rim 152, lip 154 and dividers 156, 158 cooperate with the upper edges of the piston 102 and the divider 114 to enclose the subchambers 116, 118. The lid also includes vent holes 160, 162 that provide venting for the subchambers 116, 118.

Figure 4:
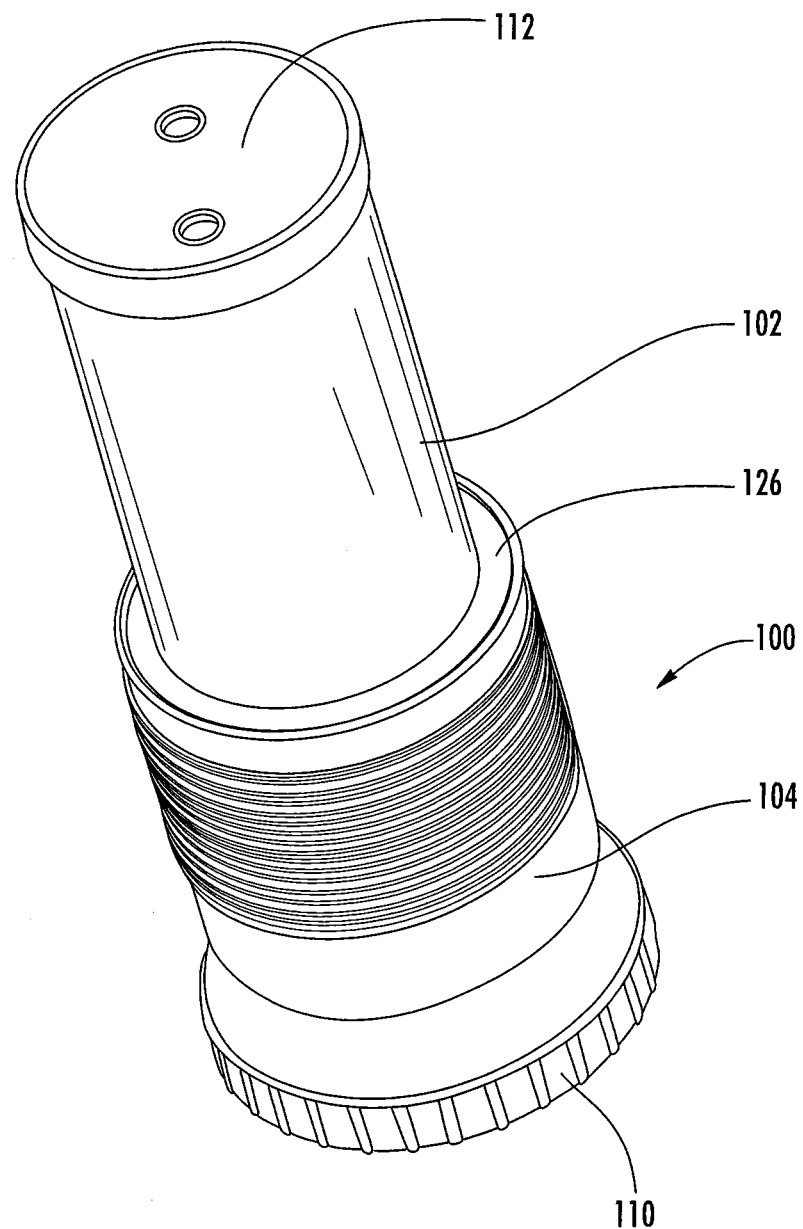
FIG. 4 is a top perspective view of a dispensing device for dispensing mixed liquids in precise doses according to embodiments of the invention.
Figure 17:
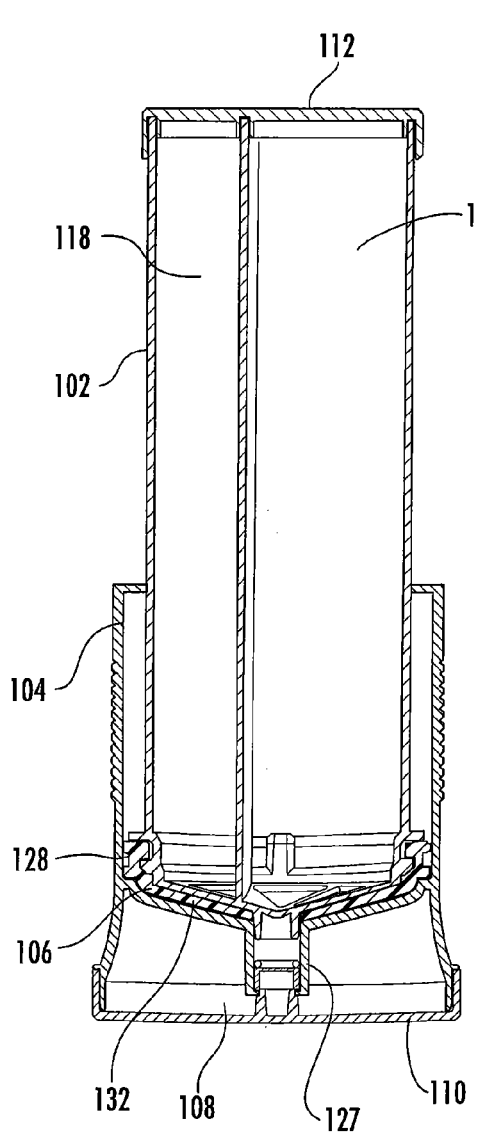
FIG. 17 is a front view of the dispensing device of FIG. 4 in its dispensing position.

In operation, the dispensing device 100 begins in a "dispensing" position shown in FIGS. 4, 5 and 17. In this position, the piston 102 is lowered relative to the sleeve 104, such that the valve dome 120 and valve 106 are adjacent to the spout 108. The flaps 132 of the valve 106 are in a closed position over the openings 122 of the valve dome 120, preventing flow of liquid from the subchambers 116, 118 through the valve 106. The ridges 128 of the valve 106 engage the inner surfaces of the sleeve 104 to form a seal. The nipple 129 engages the nozzle 127 to form a seal at that location. Also, the plug 144 of the stopper 110 is inserted into the nozzle 127. The subchambers 116, 118 are filled with liquid; typically, the subchambers 116, 118 are filled with two different liquids that are to be mixed upon dispensing.

Due to the presence of the divider 114 and the valve 106, the subchambers 116, 118 are in fluid isolation from each other. Exemplary pairs of liquids that may require separation prior to mixing for use include a dyed colorant and an accelerator.

Figure 18:
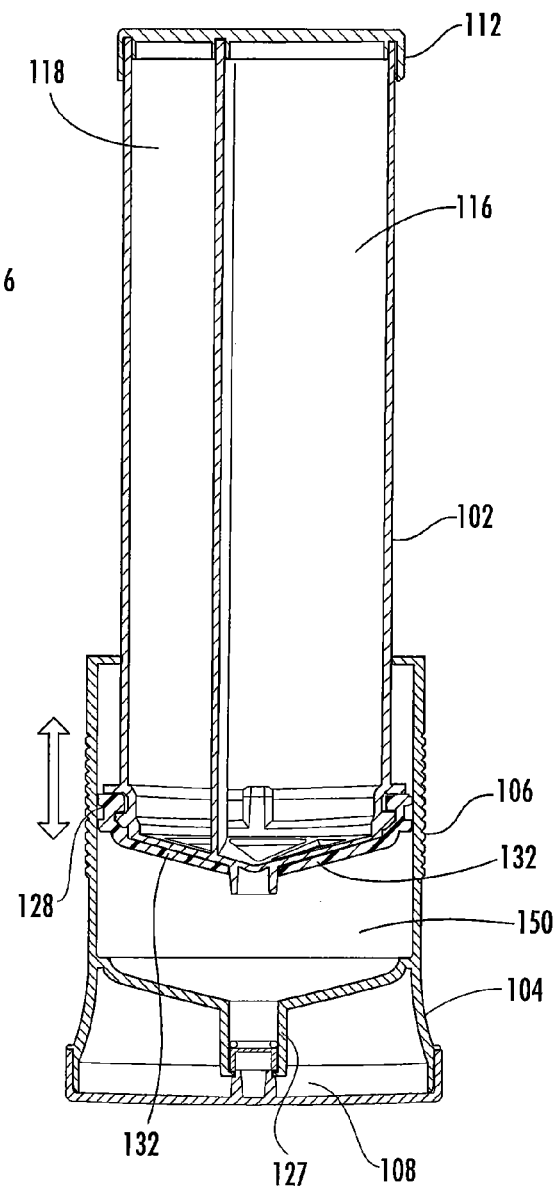
FIG. 18 is a front view of the dispensing device of FIG. 4 in its mixing position.

To dispense a measured dose of liquid, first the piston 102 is raised relative to the sleeve 104 to a mixing position (see FIG. 18). Upward movement of the valve 106 away from the spout 108 forms a mixing chamber 150 between the valve 106, the spout 108, and the walls of the sleeve 114. Also, the movement of the piston 102 relative to the sleeve 104 causes the flaps 132 to deflect to an open position, which enables liquid in the first and second subchambers 116, 118 to flow through the openings 122 into the mixing chamber 150. (Flow of the liquids into the mixing chamber 150 through the openings 122 is described in some detail in aforementioned International Publication No. WO 2013/126553). The liquids in the first and second subchambers 116, 118 mix within the mixing chamber 150. If, as is the case in some embodiments, the liquids in the first and second subchambers 116, 118 are different, these liquids blend into a mixture containing both liquids. The liquids are dispensed into the mixing chamber 150 in the proportions defined by the volumes of the subchambers 116, 118; for example, if the subchamber 116 holds twice as much liquid as the subchamber 118, then the resulting mixture within the mixing chamber will have a 2:1 ratio. Once the mixing chamber 150 is filled with liquid, the flaps 132 recover to their original positions covering the openings 122.

The stopper 110 can be removed from the spout 108 to uncover the nozzle 127 (shown in FIG. 18). The mixed liquid can then be removed from the mixing chamber 150 by lowering the piston 102 relative to the sleeve 104 (shown in FIG. 17) such that the mixing chamber 150 substantially disappears. This movement forces the mixed liquid from the mixing chamber 150 and out of the nozzle 127 (which serves as a dispensing outlet) to the desired destination. The seal between the ridges 128 of the valve 106 and the inner surface of the sleeve 104 prevent leakage of liquid from the mixing chamber 150 back into either of the subchambers 116, 118, as do the seals formed by the flaps 132 over the openings 122.

Notably, and as discussed in International Publication No. WO 2013/126553, supra, the dosage of the mixed liquid in the mixing chamber 150 can be quite precisely dispensed. In some embodiments, the piston 102 and sleeve 104 can be configured such that a "full draw" of the piston 102 relative to the sleeve 104 fills the mixing chamber with a desired dosage. Alternatively, the sleeve 104 and/or the piston 102 may include graduated indicia that indicate the extent to which the piston 102 should be moved to fill the mixing chamber 150 with a desired dosage. As another alternative, the sleeve 104 and/or the piston 102 may be include features, such as detents and the like, that provide a tactile or audible "click" that indicates a particular desired dosage. Other techniques for alerting the user to a specific dosage may also be employed.

It will be also understood that the flared end of the sleeve 104 may be configured to mate or otherwise interact with a container into which the mixed liquid is to be dispensed. Such mating may be achieved via a press-fit, threads, or the like.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A precise-dosing dispensing device, comprising:
   a first chamber and a second chamber, the first chamber being longitudinally movable in the second chamber and having an outer surface sealingly contacting an inner surface of the second chamber;
   an outlet passage adapted to deliver the liquid product being dispensed by the dispensing device, said outlet passage being fluidly connected to the second chamber;
   an intermediate valve positioned between an interior part of the first chamber and an interior part of the second chamber, wherein the valve is configured to (a) allow the liquid product to flow from the interior space of first chamber to the interior space of the second chamber when the first chamber is moved in a first longitudinal direction and to (b) limit flow of the liquid product from the interior space of the second chamber to the interior space of the first chamber when the first chamber is moved in an opposite second longitudinal direction to dispense the liquid product from the second chamber through the outlet passage; and
   a blocking member movable in concert with the first chamber, the blocking member configured to seal the outlet passage when the valve limits flow of the liquid product from the interior space of the second chamber to the interior space of the first chamber.

2. The dispensing device defined in claim 1, wherein the blocking member is attached to the first chamber.

3. The dispensing device defined in claim 1, wherein the blocking member is a circular boss that extends away from the interior space of the first chamber.

4. The dispensing device defined in claim 1, wherein the first chamber is mounted to a fitment, the fitment being attached to a bag formed of a flexible material.

5. The dispensing device defined in claim 4, wherein the bag is contained within a rigid bottle.

6. The dispensing device defined in claim 1, wherein the first and second chamber are configured such that rotation of the second chamber relative to the first chamber causes the second chamber to move longitudinally relative to the first chamber.

7. The dispensing device defined in claim 1, wherein the blocking member extends through an opening in the intermediate valve.

8. A device for dispensing a liquid mixture, comprising:
   a piston including first and second subchambers, each of the first and second subchambers including openings at one end thereof;
   a sleeve that receives the piston and is slidable relative thereto, the sleeve including a dispensing outlet;
   wherein the piston is slidable between a mixing position, wherein a mixing chamber is formed between the piston and the sleeve that is in fluid communication with the first and second subchambers, and a dispensing position;
   a valve positioned between the piston and the dispensing outlet of the sleeve, the valve configured to move between an open position, which allows liquid product to flow from the first and second subchambers through the openings to the mixing chamber when the piston is moved relative to the sleeve to the mixing position, and to a closed position, which limits flow of the liquid product from first and second subchambers through the openings to the mixing chamber when the piston is moved relative to the sleeve to the dispensing position to dispense the liquid product from the mixing chamber through the dispensing outlet;
   wherein the first and second subchambers are in fluid isolation from each other when the piston is in the dispensing position.

9. The dispensing device defined in claim 8, wherein the first subchamber has a different volume than the second subchamber.

10. The dispensing device defined in claim 8, wherein the first subchamber includes a first liquid product, and the second subchamber includes a second liquid product that differs from the first liquid product.

11. The dispensing device defined in claim 8, wherein in the dispensing position the valve contacts the dispensing outlet such that the mixing chamber substantially disappears.

12. The dispensing device defined in claim 8, wherein the valve is attached to the piston in the mixing and dispensing positions.

13. The dispensing device defined in claim 8, wherein the valve forms a seal with an inner surface of the sleeve.

14. The dispensing device defined in claim 8, wherein the dispensing outlet comprises a spout integrally formed with the sleeve.

15. The dispensing device defined in claim 8, wherein the piston includes a nipple, wherein the dispensing outlet includes a nozzle, and wherein the nipple engages the nozzle in the dispensing position to prevent liquid from leaking through the dispensing outlet.

16. The dispensing device defined in claim 8, further comprising a stopper attached to the sleeve.

17. The dispensing device defined in claim 8, wherein each of the first and second subchambers are vented.

18. A method of dispensing a mixture of liquids, comprising the steps of:
(a) providing a dispensing device comprising:
a piston including first and second subchambers, each of the first and second subchambers including openings at one end thereof, the first subchamber filled with a first liquid, and the second subchamber filled with a second liquid that is different than the first liquid;
a sleeve that receives the piston and is slidable relative thereto, the sleeve including a dispensing outlet;
wherein the piston is slidable between a mixing position, wherein a mixing chamber is formed between the piston and the sleeve that is in fluid communication with the first and second subchambers, and a dispensing position; and
a valve positioned between the piston and the dispensing outlet of the sleeve, the valve configured to move between an open position, which allows liquid product to flow from the interior space of the first and second subchambers through the openings to the mixing chamber when the piston is moved relative to the sleeve to the mixing position, and to a closed position, which limits flow of the liquid product from the interior space of the first and second subchambers through the openings to the interior space of the mixing chamber when the piston is moved relative to the sleeve to the dispensing position to dispense the liquid product from the mixing chamber through the dispensing outlet;
wherein the first and second subchambers are in fluid isolation from each other when the piston is in the dispensing position;
(b) sliding the piston to the mixing position to allow a portion of the first liquid and a portion of the second liquid to flow into the mixing chamber to form a mixture; and
(c) sliding the piston to the dispensing position to dispense the mixture from the mixing chamber.

19. The method defined in claim 18, wherein the volume of the first liquid dispensed into the mixing chamber differs from the volume of the second liquid dispensed into the mixing chamber.

* * * * *